United States Patent Office 3,522,347
Patented July 28, 1970

3,522,347
TOXOID COMPOSITIONS
Frank Buonfiglio Ablondi, Pearl River, N.Y., and Murray Sam Cooper, Dumont, N.J., assignors to American Cyanamid Company, Stamford, Conn., a corporation of Maine
No Drawing. Filed Jan. 25, 1968, Ser. No. 700,384
Int. Cl. A61k 23/00
U.S. Cl. 424—92                    7 Claims

ABSTRACT OF THE DISCLOSURE

Toxoid compositions are provided containing a toxoid and a water insoluble, aluminum or lanthanum salt of a substituted or unsubstituted salicyclic acid. Exemplary of such toxoid compositions is a composition containing tetanus toxoid and aluminum acetyl salicylate. The salicylate adsorbs the toxoid and enhances its immunizing effect while reducing inflammation and irritation at the site of injection.

---

This invention relates to toxoid compositions. More particularly, it relates to anti-inflammatory adjuvant toxoid compositions containing a toxoid adsorbed on a water insoluble aluminum or lanthanum salt of a substituted or unsubstituted salicylic acid.

Compositions containing antigenic toxoids are useful as vaccines to induce the production of antitoxins within the body of the human or animal patient treated with the vaccine, and to provide immunity against the particular toxin of the vaccine. The protective capacity of toxoids have been enhanced in the past by adsorbing the toxoid on a water insoluble, inorganic aluminum salt, such as aluminum phosphate. These inorganic salts act as adjuvants for the toxoid and produce overall toxoid compositions that are more effective than the toxoid alone.

Toxoids, however, may cause irritation and inflammation at the site of injection. Tetanus toxoid, for example, can be unpredictably troublesome in causing such local irritation and inflammation. While certain insoluble inorganic aluminum salts, such as aluminum phosphate are in widespread use to enhance the protective capacity of these toxoids, unfortunately no beneficial effect on the inflammation and irritation at the site of injection of the toxoid is obtained.

An object of this invention is to provide toxoid compositions which have an enhanced immunizing effect over that produced by the toxoid alone, and also produce only minimum irritational and inflammatory side effects at the site of injection.

A further object of this invention is to provide toxoid compositions containing a toxoid adsorbed on a water insoluble, aluminum or lanthanum salt of a substituted or unsubstituted salicylic acid, which compositions have an increased immunizing effect and a reduced inflammation and irritation effect over that of the toxoid alone.

Additional objects and advantages will be set forth in part in the description which follows and in part will be obvious from the description, or may be learned by practice of the invention, the objects and advantages being realized and attained by means of the compositions and improvements particularly pointed out in the appended claims.

To achieve the foregoing objects and in accordance with its purpose, this invention, as embodied and broadly described, relates to a toxoid composition comprising a diluent, a toxoid, and a water insoluble salt selected from an aluminum or lanthanum salt of a substituted or unsubstituted salicylic acid. The salt is present in the overall composition in at least an amount sufficient to substantially adsorb the toxoid. The toxoid adsorbed in the insoluble salt enhances to toxoid's immunizing effect and the salt reduces inflammation and irritation at the site of injection.

Certain soluble salts of salicylic acid have been used for their anti-inflammatory properties, but the use of the insoluble salts described herein in toxoid compositions to reduce undesirable side reactions and provide an adjuvant effect on the toxoid has not heretofore been suggested.

The present invention therefore resides in the provision of a novel class of toxoid adjuvant compositions that not only have highly effective adjuvant properties but also have the additional property to reduce inflammation and irritation at the site of the toxoid injection.

The toxoid compositions of this invention include any of the bacterial toxoids, such as diphtheria toxoid, dysentery toxoid, typhoid toxoid, botulism toxoid, tetanus toxoid, as well as other immunizing agents. Tetanus toxoid was used to demonstrate this invention because it lends itself to laboratory and clinical standardization.

Exemplary of insoluble salts which may be used in this invention are aluminum and lanthanum salicylate, acetyl salicylate (aspirinate), p-amino salicylate and the like. Generally, any insoluble aluminum or lanthanum salt of a salicylic acid derivative is considered operable in this invention. Aluminum acetyl salicylate (aspirinate) is the derivative of choice.

The toxoid compositions of this invention can be prepared by mixing the toxoid and the insoluble organic salt in an aqueous medium in such proportions that the resulting toxoid composition in dosage unit form contains sufficient insoluble salt to substantially adsorb all of the toxoid necessary to provide the desired immunizing effect and optimal anti-inflammatory effect.

For example, a suspension containing about 1 mg of aluminum acetyl salicylate may be used to adsorb up to 80 Lf. of tetatnus toxoid. If the desired immunizing effects, therefore, require the use of a toxoid concentration of 5 Lf. per dose, for example, approximately 0.0625 mg. per dose of aluminum acetyl salicylate should be sufficient to adsorb all of the toxoid. Preferably, the toxoid compositions contain an excess of the organic aluminum or lanthanum salt to insure substantially complete adsorption of the toxoid by the salt. The use of such an excess of the salt insures the desired enhancement of the immunizing effect of the toxoid and also insures that sufficient quantities of the salt are present to achieve the desired reduction of side reactions at the site of the injection.

For a clearer understanding of this invention, specific examples of it are set forth below. These examples illustrate the adsorption of tetanus toxoid on some aluminum and lanthanum salts of substituted and unsubstituted salicylic acids. They also illustrate the adjuvant effect of the toxoid when it is adsorbed on these insoluble salts.

These examples are merely illustrative and are not to be understood as limiting the scope and underlying principles of the invention in any way.

EXAMPLE 1

This example illustrates the adsorption of tetanus toxoid on aluminum acetyl salicylate (aluminum aspirinate). A 250 mg. sample of commercially available aluminum aspirinate was ground with a small amount of water to form a suspension. The suspension was then adjusted to a concentration of 30 mg. of aluminum aspirinate per ml. of water, and its pH adjusted to 6.0 with sodium hydroxide.

One (1) ml. samples of a liquid preparation of tetanus toxoid having a concentration of 2400 Lf./ml. and a pH of 6.0 were added to 0.5 ml., 1.0 ml., 2.0 ml., and 3.0 ml. samples of the aluminum aspirinate suspension. The resulting samples thus each contained 2400 Lf. of toxoid and 15 mg., 30 mg., 60 mg., and 90 mg. of aluminum aspirinate, respectively. In addition, a control sample of a tetanus toxoid liquid containing no aluminum aspirinate was used in this example.

All samples were adjusted to a pH of 6.0 and the volumes were brought up to 15 ml. by the addition of sterile water. After occasional swirling for one-half hour, the volume of each sample was adjusted to 30 ml. with additional sterile water. Each 30 ml. sample thus contained 80 Lf./ml. of toxoid and 0.0, 0.5, 1.0, 2.0, and 3.0 mg./ml. of aluminum aspirinate, respectively.

Each sample was then shaken, allowed to set for 2 hours, and centrifuged to separate the water insoluble aluminum aspirinate which contained adsorbed tetanus toxoid from the liquid supernatant. The supernatants of each sample were then tested for the presence of tetanus toxoid by their ability to flocculate a standard antitoxin. The results of these tests are shown in Table I.

TABLE I

| Sample Number: | Aluminum aspirinate, mg./ml. | Tetanus toxoid, Lf./ml. | Amount of toxoid in supernatant, Lf./ml. |
|---|---|---|---|
| Control | 0.0 | 80 | 6 |
| 1 | 0.5 | 80 | 4 |
| 2 | 1.0 | 80 | |
| 3 | 2.0 | 80 | |
| 4 | 3.0 | 80 | |

The results of this example show that 80 Lf. of toxoid was completely adsorbed by about 1 mg. of aluminum aspirinate at a pH of about 6.0.

EXAMPLE 2

This example illustrates the preparation of aluminum salicylate and the adsorption of tetanus toxoid on aluminum salicylate.

Preparation of aluminum salicylate

A 16 gram sample of sodium salicylate was dissolved in 100 ml. of sterile water. To this solution was added 22.0 grams of aluminum sulfate$\cdot 18H_2O$ in 100 ml. of water, giving a faint pink solution containing some precipitate. The pH was adjusted to 6.0 with 25 ml. of dilute sodium hydroxide producing a voluminous precipitate. Additional quantities of water were then added to give a 300 ml. suspension.

Adsorption of tetanus toxoid on aluminum salicylate

The procedure of Example 1 was repeated except that 10 ml. samples, instead of 30 ml. samples, were prepared containing 1.0 ml. of a liquid preparation of tetanus toxoid having a concentration of 2000 Lf./ml., and 0.5, 1.0, 2.0, 3.0, and 4.0 ml. of the above prepared aluminum salicylate suspension. A 10 ml. sample (control No. 1) of the above salt suspension only, and a 10 ml. sample (control No. 2) containing 1 ml. of the tetanus toxoid preparation only were used as controls in this example.

The supernatants of each sample were collected and tested for the presence of tetanus toxoid by adding trichloroacetic acid which precipitates tetanus toxoid if present. The results of these tests are shown in Table II. If no precipitate is obtained, then the test is negative and the absence of toxoid or other proteins in the supernatant is indicated. Potency tests were also carried out on the supernatant by antitoxin flocculation test, to establish reliability of the trichloroacetic acid precipitation test for the presence or absence of toxoid.

TABLE II

| | Volume of aluminum salicylate suspension, ml. | Tetanus toxoid, Lf./ml. | Trichloroacetic acid ppt. of supernatant | Amount of toxoid in supernatant, Lf./ml. (Flocculation) [1] |
|---|---|---|---|---|
| Sample Number: | | | | |
| Control No. 1 | 10 | 0 | 0 | 6 |
| Control No. 2 | 0 | 200 | ++++ | 240 |
| 1 | 0.5 | 200 | ++++ | 195 |
| 2 | 1.0 | 200 | +++ | 185 |
| 3 | 2.0 | 200 | ± | 11 |
| 4 | 3.0 | 200 | 0 | 0 |
| 5 | 4.0 | 200 | 0 | 0 |

[1] Potency test subject to assay error.

The results of this example show that 3 ml. of supension adsorbed 200 Lf. of toxoid.

EXAMPLE 3

This example illustrates the preparation of aluminum p-amino salicylate and the adsorption of tetanus toxoid on aluminum p-amino salicylate.

Preparation of aluminum p-amino salicylate

A 17.5 gram sample of sodium p-amino salicylate was dissolved in 100 ml. of water. To this solution was added 22.0 grams aluminum sulfate$\cdot 18H_2O$ in 100 ml. of water. The pH was adjusted from 3.5 to 6.1 with 15 ml. of dilute sodium hydroxide producing a precipitate. The aluminum p-amino salicylate suspension was sterilized with 0.5% ethylene oxide for seven (7) days to insure the destruction of any microorganisms or other bacteria in the salicylate suspension.

Adsorption of tetanus toxoid on aluminum p-amino salicylate

The procedure of the adsorption section of Example 2 was repeated except that the ethylene oxide-sterilized aluminum p-amino salicylate produced above was used in place of aluminum salicylate.

Tests were conducted for the presence of tetanus toxoid in the supernatant of each sample using trichloroacetic acetic acid as described in Example 2. The test shows that 2.0 ml. of suspension adsorbed all of the trichloroacetic acid precipitable toxoid material.

EXAMPLE 4

This example illustrates the preparation of lanthanum salicylate and adsorption of tetanus toxoid on lanthanum salicylate.

16.88 g. of lanthanum acetate was dissolved in 225 ml. of distilled water and adjusted to pH 6.0. Then 16.3 g. of sodium salicylate was added in 75 ml. of distilled water at pH 6.0. The precipitate which formed was collected by filtration after standing for about one hour, and washed 6 times with 25 ml. portions of water. The wash was discarded. The white precipitate was dried.

Adsorption of tetanus toxoid on lanthanum salicylate

The procedure of the adsorption of Example 2 was repeated except that lanthanum salicylate, prepared above, was used in place of aluminum salicylate. Trichloroacetic acid precipitation tests on the supernatant showed that 20 Lf. of toxoid was completely adsorbed on about 1 mg. of lanthanum salicylate.

oid samples, all mice were challenged with tetanus toxin. Ninety-six (96) hours after challenge, the survivors of each group of ten (10) mice were counted. The results of these tests are shown in Table III.

As shown in this table, the $ED_{50}$, which is the toxoid concentration per dose sufficient to protect 50% of the individuals in the test groups, the immunizing effect of tetanus toxoid was enhanced by aluminum aspirinate and aluminum phosphate to about the same extent.

TABLE III.—SURVIVORS IN EACH GROUP OF 10 MICE

| Sample | Lf's per mouse | 14 days Survivors | $ED_{50}$ [1] |
|---|---|---|---|
| Fluid Unadsorbed toxoid | 40 | Not done | |
| | 13.35 | 10 | |
| | 4.45 | 10 | |
| | 1.48 | 10 | <.05 |
| | .49 | 10 | |
| | .156 | 9 | |
| | .055 | 8 | |
| Aluminum phosphate adsorbed 1 mg./mouse | 4.0 | Not done | |
| | 1.34 | 10 | |
| | .45 | 10 | |
| | .15 | 10 | About |
| | .05 | 8 | .016 |
| | .016 | 5 | |
| | .006 | Not done | |
| Aluminum aspirinate 1 mg./mouse | 4.0 | Not done | |
| | 1.34 | 10 | |
| | .45 | 10 | |
| | .15 | 10 | <.016 |
| | .05 | 10 | |
| | .016 | 9 | |
| | .006 | Not done | |
| Controls (No toxoid) | 0 | 0 | |

[1] $ED_{50}$'s not calculated in this test since straddling of 50% end point was not obtained.

EXAMPLE 5

This example illustrates the adjuvant effect of aluminum aspirinate on tetanus toxoid.

A first set of 0.5 ml. samples was prepared containing 40, 13.35, 4.45, 0.49, 0.156, and 0.055 Lf. of tetanus toxoid per 0.5 ml., respectively; no adjuvant added.

A second set of 0.5 ml. sample doses was prepared using the same tetanus toxoid adsorbed to aluminum phosphate. The equivalent of 4.0, 1.34, 0.45, 0.15, 0.05 and 0.02 Lf. of tetanus toxoid per 0.5 ml. were prepared diluted with aluminum phosphate suspension, so that each of the diluted toxoid samples contained a total of 1.0 mg. of the aluminum phosphate. All preparations were adjusted to pH 6.0.

A third set was prepared as in the second set above, using aluminum aspirinate, wherein each of the 0.5 ml. samples contained the above concentration of tetanus toxoid and 1 mg. of aluminum aspirinate per 0.5 ml., adjusted to pH 6.0.

EXAMPLE 6

The procedure of Example 5 was repeated, except that 1 mg. of aluminum salicylate was substituted for aluminum aspirinate. Further, a fourth set of 0.5 ml. sample doses was prepared containing the same concentrations of tetanus toxoid and five mgs. of aluminum salicylate.

To illustrate the adjuvant effect achieved by adsorbing the tetanus toxoid on an aluminum salt of salicylic acid, a fifth group of sample doses were prepared in which the mice are injected with the same concentrations of tetanus toxoid at one site and with sample doses containing 5 mgs. of aluminum salicylate only at a distal site.

The results of this example are recorded in Table IV below. As shown by these results, the $ED_{50}$ of the toxoid fluid adsorbed to the aluminum salicylate is improved. The injection of pure aluminum salicylate at the distal site had no effect, showing that it is the adsorption of the toxoid on this organic salt which achieves the improved immunizing effect.

TABLE IV.—SURVIVORS IN EACH GROUP OF 10 MICE

| Toxoid concentration, Lf./dose | Unadsorbed fluid toxoid (Control) | Salt concentration (mg./dose) | | | |
|---|---|---|---|---|---|
| | | 1 mg. aluminum phosphate | 1 mg. aluminum salicylate | 5 mg. aluminum salicylate | 5 mg. aluminum salicylate at distal site |
| 7.0 | 7 | | | | |
| 2.3 | 4 | 10 | 9 | 8/8 | 3 |
| 0.765 | 4 | 9 | 7 | 4 | 4 |
| 0.250 | 0 | 8 | 5 | 4 | 0 |
| 0.085 | 0 | 2 | 2 | 2 | 0 |
| 0.028 | 0 | 0 | 1 | 1 | 0 |
| 0.009 | | 0 | 0 | 0 | 0 |
| .000 | 0 | | | 0 | |
| ED/50 [1] | 2.5 | 0.15 | 0.28 | 0.39 | 2.7 |

[1] Toxoid concentration of a dosage unit (Lf./0.5 ml. dose) sufficient to protect 50% of the test individuals in the group.

Groups of ten (10) female mice, each weighing between 14 and 16 grams, were injected subcutaneously with each of the above dilutions of tetanus toxoid sample doses. An additional group of ten (10) control mice received no immunizing injections, to test the lethality of the toxin used to challenge the above immunized animals.

Fourteen (14) days after injection with the tetanus tox-

EXAMPLE 7

The procedure of Example 6 was repeated, except that ethylene oxide-sterilized, aluminum p-amino salicylate is substituted for aluminum salicylate in each of the group of sample doses prepared in Example 6. The results of this example are set forth in Table V below.

As shown in this table, the $ED_{50}$ of the toxoid fluid was enhanced by the addition of ethylene oxide-sterilized aluminum p-amino salicylate.

TABLE V.—SURVIVORS IN EACH GROUP OF 10 MICE

| Toxoid concentration (Lf./dose) | Unadsorbed fluid toxoid (Control) | Salt Concentration, mg./dose | | | |
|---|---|---|---|---|---|
| | | 1 mg. aluminum phosphate | 1 mg. aluminum p-amino salicylate | 5 mg. aluminum p-amino salicylate | 5 mg. aluminum p-amino salicylate at distal site |
| 7.0 | 9 | ---- | ---- | ---- | 6 |
| 2.3 | 7 | 10 | 10 | 8 | 1 |
| 0.765 | 6 | 9 | 8 | 6 | 1 |
| 0.250 | 4 | 9 | 7 | 2 | 1 |
| 0.085 | 0 | 5 | 5 | 1 | 0 |
| 0.028 | 0 | 1 | 3 | 0 | 0 |
| 0.009 | ---- | 0 | 0 | 0 | ---- |
| .000 | 0 | ---- | ---- | 0 | ---- |
| $ED/50$ [1] | 0.70 | 0.09 | 0.10 | 0.65 | 2.2 |

[1] Toxoid concentration of a dosage unit (Lf./0.5 ml. dose) sufficient to protect 50% of the test individuals in the group.

What is claimed is:

1. A toxoid composition comprising an aqueous suspension having a pH adjusted to about 6 containing a subcutaneous dosage unit amount of botulism toxoid, diphtheria toxoid, dysentery toxoid; typhoid toxoid, or tetanus toxoid, tending to cause inflammation and irritation at the site of the injection and ethylene-oxide sterilized water-insoluble salt selected from the group consisting of aluminum salicylate, aluminum p-amino salicylate and aluminum acetyl salicylate, the salt being present in an amount at least sufficient to substantially adsorb the toxoid, to enhance the immunizing effect, and to reduce inflammation and irritation at the site of the injection.

2. The composition of claim 1 wherein the salt is aluminum salicylate.

3. The composition of claim 1, wherein the salt is aluminum acetyl salicylate.

4. The composition of claim 1, wherein the salt is aluminum p-amino salicylate.

5. The composition of claim 1, wherein the toxoid is tetanus toxoid.

6. The composition of claim 5, wherein the salt is aluminum salicylate.

7. The composition of claim 5, wherein the salt is aluminum acetyl salicylate.

References Cited

UNITED STATES PATENTS

| 2,369,218 | 2/1945 | Dick et al. | 424—93 XR |
| 3,145,144 | 8/1964 | Ando | 424—230 XR |
| 3,328,256 | 6/1967 | Gaunt | 424—230 XR |
| 3,350,270 | 10/1967 | Gaunt | 424—230 XR |
| 3,449,489 | 6/1969 | Gaunt | 424—31 |

FOREIGN PATENTS

| 981,242 | 1/1965 | Great Britain. |

SHEP K. ROSE, Primary Examiner

U.S. Cl. X.R.

424—230